(12) United States Patent
Frommelt et al.

(10) Patent No.: US 6,340,508 B1
(45) Date of Patent: Jan. 22, 2002

(54) FIRE-RESISTANT GLAZING ASSEMBLY

(75) Inventors: Simon Frommelt, Haan; Udo Gelderie, Stolberg; Guido Plum, Aldenhoven, all of (DE)

(73) Assignee: Vetrotech Saint-Gobain (International) AG (CH)

( * ) Notice: Subject to any disclaimer, the term of this patent is extended or adjusted under 35 U.S.C. 154(b) by 0 days.

(21) Appl. No.: 09/337,551

(22) Filed: Jun. 22, 1999

(30) Foreign Application Priority Data

Jun. 23, 1998 (DE) .......................................... 198 27 867

(51) Int. Cl.⁷ .............................. E06B 3/24; B27N 9/00; E04C 2/54
(52) U.S. Cl. .......................... 428/34; 428/913; 428/920; 52/786.13
(58) Field of Search .......................... 428/34, 409, 410, 428/913, 920, 921; 52/786.13, 232

(56) References Cited

U.S. PATENT DOCUMENTS

| | | | | |
|---|---|---|---|---|
| 3,791,910 A | * | 2/1974 | Bowser | 428/34 |
| 4,268,581 A | * | 5/1981 | De Boel | 428/428 |
| 4,853,264 A | * | 8/1989 | Vincent et al. | 428/34 |
| 5,244,709 A | * | 9/1993 | Vanderstukken | 428/34 |
| 5,437,902 A | | 8/1995 | Itoh et al. | 428/68 |
| 5,565,273 A | | 10/1996 | Egli et al. | 428/426 |
| 5,653,839 A | * | 8/1997 | Itoh et al. | 156/109 |

FOREIGN PATENT DOCUMENTS

| EP | 0 590 978 B1 | 2/1998 |
|---|---|---|
| FR | 2394394 | 1/1979 |
| JP | 61118209 | 6/1986 |
| JP | 06027442 | 2/1994 |
| JP | 08252888 | 10/1996 |
| JP | 11100239 | 4/1999 |
| WO | WO 94/04355 | 3/1994 |

\* cited by examiner

*Primary Examiner*—Donald J. Loney
(74) *Attorney, Agent, or Firm*—Pennie & Edmonds LLP

(57) ABSTRACT

A fire-resistant glazing assembly comprises two glass sheets (1, 2) connected together along their edges by a spacer (3) and a water-containing interlayer (4) between the two panes (1, 2). The spacer (3) is made of silicone rubber. A bead (6) of a heat-activated foaming material is advantageously placed between the spacer (3) and the adhesive sealing material (7) serving to provide the peripheral seal.

15 Claims, 1 Drawing Sheet

FIRE-RESISTANT GLAZING ASSEMBLY

BACKGROUND OF THE INVENTION

The present invention relates to a fire-resistant glazing assembly composed of at least two glass sheets connected together by a spacer along their edges and of a water-containing interlayer which fills the intermediate space between the glass sheets, the spacer being adhesively bonded to the two glass sheets and the peripheral seal between the spacer and the peripheral regions of the glass sheets being sealed by means of an adhesive sealing material.

Fire-resistant glazing assemblies of this type are known from document EP 0,590,978 A1. In the case of this known fire-resistant glazing assembly, the water-containing interlayer is composed of a hydrogel with a polymer of a methacrylamide derivative acting as gelling agent. The spacer comprises a profiled bead made of a rigid material, namely a metal or ceramic, and butyl rubber acts as adhesive between the spacer and the glass sheets.

The manufacture of fire-resistant glazing assemblies having this structure poses real problems when they use, for example, curved panes. It is in fact difficult to give spacers made of a rigid material a shape such that their bending corresponds exactly to the curving of the panes. Furthermore, the individual curved panes often have shape defects in their peripheral regions. When bonding the two panes together by means of a rigid spacer frame, tensile mechanical stresses may easily occur in the peripheral regions under these conditions, and consequently non-sealed regions may appear in the peripheral regions.

In addition, it has been found that glazing assemblies characterized by this known structure therefore do not always have the desired duration of fire resistance because, in the event of a fire, heat transfer via the frame supporting the fire-resistant glazing assembly in the peripheral zone of the glazing assembly results in tensile stresses which can damage the peripheral region, thereby causing the assembly to break prematurely.

SUMMARY OF THE INVENTION

The objective of the invention is to improve the fire-resistant glazing assemblies mentioned in the preamble, in such a way that the peripheral bonding and the sealing in the spacer region are also suitable for the manufacture of non-planar fire-resistant glazing assemblies and at the same time provide better thermal insulation of the edges of the assembly in the event of a fire.

According to the invention, this objective is achieved in that the spacer comprises a profiled bead made of silicone rubber.

Compared with the known fire-resistant glazing assemblies, in the case of the structure according to the invention a spacer composed of an elastic rubber material is used, which material, because of its elasticity, adapts to the irregularities in the glass sheet and easily follows the shape of the panes, even in the case of highly curved panes. Because of the low thermal conductivity of silicone rubber compared with that of a metal, the transfer of heat from the pane exposed to the fire towards the marginal region of the other pane is greatly reduced.

Consequently, the occurrence of thermal gradients that might damage the other pane are avoided or at least greatly reduced.

The fact of using silicone rubber for the spacer has the additional major advantage that, compared with other polymers, no toxic decomposition product is produced in the event of a fire. In addition, silicone rubber is highly heat-resistant and has a very high decomposition temperature. Furthermore, silicone rubber is resistant from a chemical standpoint and is easy to process so that, from the most varied of standpoints, fire-resistant glass produced according to the invention has significant advantages.

Particularly advantageously, spacers made of a high-temperature crosslinkable silicone rubber having a Shore A hardness of 40 to 60 are used. Silicone rubbers of this type have proved to be particularly suitable for achieving the objective of the invention.

Advantageously, a bead composed of a heat-activated foaming material is placed between the spacer and the adhesive sealing material.

The presence of the foaming material in the peripheral seal also acts to reduce the thermal gradients. This is because the foam, which forms under the effect of the heat, fills the fillister region between the edge of the glazing assembly and the frame, which is generally made of metal, and thus significantly decreases the heat transfer from the bottom of the fillister of the metal frame to the edge of the panes of the glazing assembly.

BRIEF DESCRIPTION OF THE DRAWINGS

Other advantageous embodiments and developments of the invention ensue from the dependent claims and from the following description of a preferred embodiment of the invention, with reference to the appended drawing in which:

DETAILED DESCRIPTION OF THE DRAWINGS

Figure 1:
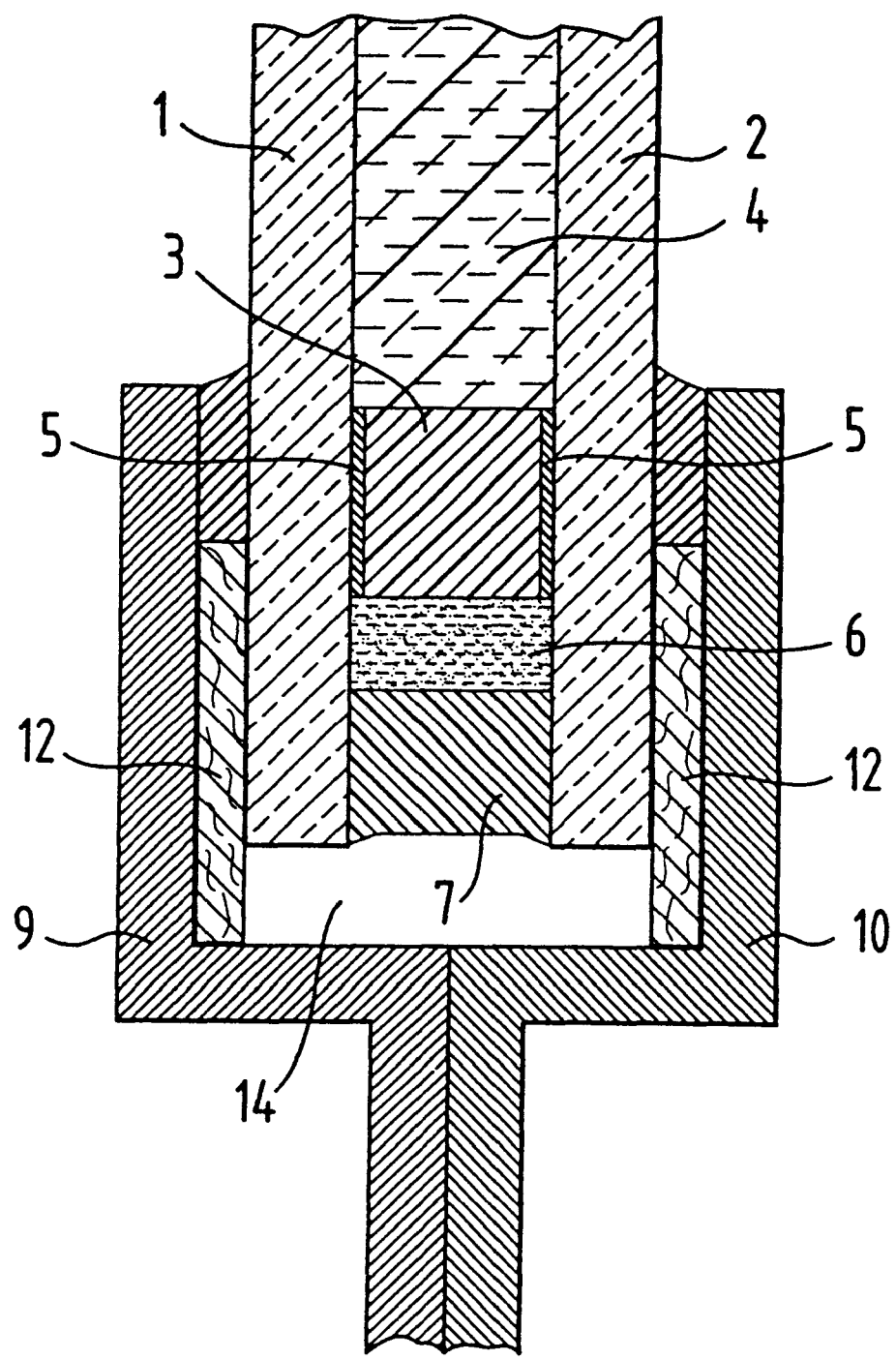
FIG. 1 shows a sectional view of the peripheral region of a fire-resistant glazing assembly according to the invention, fitted into a frame.

The fire-resistant glazing assembly shown comprises two sheets 1, 2 of thermally toughened float glass, each 6 mm in thickness. The glass sheets are separated from each other by 12 mm by the insertion of the spacer 3. The intermediate space between the sheets or panes 1, 2 and the spacer 3 is filled with an aqueous alkali metal polysilicate, which is cured and transparent, such as described in document WO 94/04 355. This alkali metal polysilicate layer 4 advantageously contains from 30 to 55% by weight of silicon dioxide, preferably at most 16% by weight of alkali metal oxide and advantageously up to 60% by weight of water. After the intermediate space between the two panes has been filled, the polysilicate is cured by heating to a temperature of between 60° C. and 90° C., an additional curing agent present in the cast mass accelerating the curing process.

The spacer 3 consists of a profiled bead made of silicone rubber, advantageously of rectangular or square cross section. As silicone rubber, a high-temperature crosslinkable polydimethylsiloxane has proved to be particularly useful for achieving this objective. The spacer 3 is adhesively bonded to the panes 1 and 2 by means of adhesive layers 5.

As adhesives, acrylate-based adhesives have proved their worth for this purpose, for example adhesive transfer tapes made of high-performance transparent adhesive material composed of 100% acrylate polymer. The acrylate polymer has as low a softening point as possible so as to ensure uniform wetting and uniform adhesion between the glass and the silicone rubber, without air being trapped between the two materials.

Placed in the peripheral groove between the peripheral regions of the two panes 1 and 2 is, after the spacer 3, a bead 6 of a heat-activated foaming material. The foaming material 6 may, for example, be based on organic and/or inorganic substances, particularly salts such as, for example, ammonium salts, aqueous borates, aqueous phosphates or oxides, which, under the effect of the heat, form easily volatile substances, such as water vapour, ammonia, sulphur dioxide, boric acid, etc., which transform the material into a foam. This foaming material is advantageously inserted in the form of profiled strips into this peripheral groove before the edge of the fire-resistant glazing assembly is sealed by the adhesive sealing material. Strips of materials, into which a mixture of powdered sulphates, calcium carbonate, aluminium oxide and silicon dioxide have been introduced, have, for example, proved their worth for this purpose.

As sealing adhesive 7, a polysulphide, such as has proved useful in the manufacture of insulating glazing, is preferably used. The adhesive 7 may be injected under pressure into the groove in a manner known per se by means of a suitable nozzle.

The fire-resistant glazing assembly is held in place, in the fitted state, by metal extrusions 9, 10, so-called blocking strips 12 being placed between the fire-resistant glass and the metal extrusions 9, 10, i.e. strips of a thermal insulation material resistant to high temperatures, for example strips made of ceramic fibres, such that the panes are protected laterally against being heated up too rapidly by the metal extrusions 9, 10.

For reasons associated with the fitting technique, a thermal insulation material resistant to high temperatures may be prevented from being placed directly in the hollow space 14 between the peripheral surfaces of the panes 1 and 2 and the bottom of the fillister of the metal frame. The desired insulating effect in the event of a fire is, for this reason, achieved by the placement of the bead 6 of foaming material. In this case, the foam insulation which forms expels the adhesive 7 and consequently fills the entire hollow space 14.

The fire-resistant glazing assemblies characterized by the structure described in detail above satisfy the requirements of Fire Protection Class F 60, as proved in the fire tests carried out in accordance with Standard DIN 4102, Part 13.

The requirements of Fire Protection Class F 30 are already fulfilled in the case of fire-resistant glazing assemblies of this type when the two panes of toughened glass each have a thickness of 5 mm and the alkali metal polysilicate layer 4 has a thickness of only 6 mm. The total thickness of an F-30 fire-break glazing assembly of this type is 16 mm. When the thickness of the interlayer 4 is increased to 25 mm and panes 6 mm in thickness are used, a fire-resistance time of more than 90 minutes is achieved, so that the fire-break glazing assemblies having the structure described, with a total thickness of 37 mm, fall within the F-90 fire-resistance class.

What is claimed is:

1. Fire-resistant glazing assembly comprising at least two glass sheets having peripheral edges and spaced from each other to define an intermediate space, said sheets being connected together by a spacer along a peripheral region adjacent said peripheral edge and a water-containing interlayer filling said intermediate space between the glass sheets, the spacer being adhesively bonded to the two glass sheets and a peripheral seal is disposed between the spacer and said peripheral edge, wherein the spacer is made of silicone rubber.

2. Fire-resistant glazing assembly according to claim 1, wherein the spacer is made of a high-temperature crosslinkable silicone rubber having a Shore A hardness of about 40 to 60.

3. Fire-resistant glazing assembly according to claim 1, wherein the spacer is made of a silicone rubber having a decomposition temperature of greater than 400° C.

4. Fire-resistant glazing assembly according to claim 3, wherein the spacer is made of a high-temperature crosslinkable polydimethyl-siloxane.

5. Fire-resistant glazing assembly according to claim 1, wherein the spacer is adhesively bonded to the glass sheets by means of an acrylate-based adhesive.

6. Fire-resistant glazing assembly according to claim 1, wherein the water-containing interlayer is formed from a cured alkali metal polysilicate and advantageously contains 30 to 55% by weight of silicon dioxide, at most 16% by weight of an alkali metal oxide and up to 60% by weight of water.

7. Fire-resistant glazing assembly according to claim 1, wherein the adhesive material serving of said peripheral seal is a polysulphide-based adhesive.

8. Fire-resistant glazing assembly according to claim 1, wherein a bead composed of a heat-activated foaming material that releases gas when heated is placed between the spacer and the adhesive sealing material.

9. Fire-resistant glazing assembly according to claim 8, wherein the bead of heat-activated foaming material, when heated, releases a gas selected from water vapour, ammonia or sulphur dioxide, and/or boric acid.

10. Fire-resistant glazing assembly according to claim 1, wherein at least one of the glass sheets is made of toughened glass.

11. Fire-resistant glazing assembly according to claim 1, wherein the glass sheets are bent into a substantially cylindrical or spherical shape.

12. Fire-resistant glazing assembly comprising at least two glass sheets having peripheral edges and spaced from each other to define an intermediate space, said sheets being connected together by a spacer adjacent said peripheral edge, and a water-containing interlayer filling said intermediate space between the glass sheets, the spacer being adhesively bonded to the two glass sheets, and a peripheral seal is disposed between the spacer and said peripheral edge, wherein the spacer is made of elastic material.

13. Fire-resistant glazing assembly according to claim 12, wherein the spacer is made of a high-temperature crosslinkable silicone rubber having a Shore A hardness of about 40 to 60.

14. Fire-resistant glazing assembly according to claim 12, wherein said peripheral seal is composed of an adhesive sealing material and a bead, composed of heat-activated foaming material, is disposed between the spacer and said adhesive sealing material.

15. Fire-resistant glazing assembly comprising at least two glass sheets having peripheral edges and spaced from each other by a spacer to define an intermediate space, said spacer being disposed along a peripheral region adjacent said peripheral edge, and a water-containing interlayer filling said intermediate space between the glass sheets, wherein a removable peripheral seal is disposed between the spacer and said peripheral edge, and a bead of heat-activated foaming material is disposed between said spacer and said peripheral seal for expelling said peripheral seal upon heating of said peripheral region of said assembly.

* * * * *

UNITED STATES PATENT AND TRADEMARK OFFICE
CERTIFICATE OF CORRECTION

PATENT NO. : 6,340,508 B1
DATED : January 22, 2002
INVENTOR(S) : Simon Frommelt, Udo Gelderie and Guido Plum It is certified that error appears in the above-identified patent and that said Letters Patent is hereby corrected as shown below:

<u>Claim 7,</u>
Line 2, delete the term "serving".

Signed and Sealed this

Sixteenth Day of April, 2002

Attest:

JAMES E. ROGAN
*Attesting Officer*     *Director of the United States Patent and Trademark Office*